BEST AVAILABLE COPY
DESIGN.
W. S. BIEL.
BEDSTEAD.
APPLICATION FILED AUG. 5, 1918.
Reissued Dec. 17, 1918. 14,566.
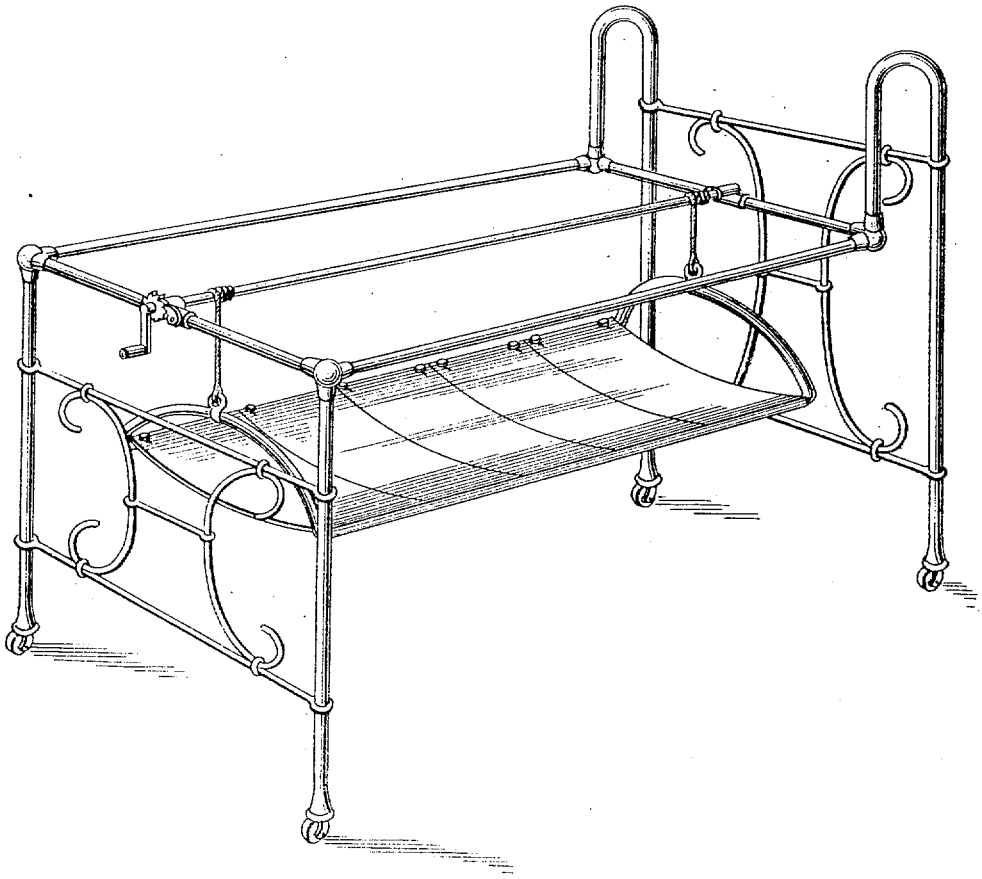
Inventor
William S. Biel
By Victor J. Evans
Attorney
THE NORRIS PETERS CO., PHOTO-LITHO., WASHINGTON, D. C.

BEST AVAILABLE COPY

UNITED STATES PATENT OFFICE.

WILLIAM S. BIEL, OF LOS ANGELES, CALIFORNIA.

DESIGN FOR A BEDSTEAD.

14,566. Specification of Reissued Design. Reissued Dec. 17, 1918.

Original No. 49,793, dated October 24, 1916, Serial No. 110,603, filed July 21, 1916, for 3½ years. Application for reissue filed August 5, 1918. Serial No. 248,480. Term of patent 14 years.

*To all whom it may concern:*

Be it known that I, WILLIAM S. BIEL, a citizen of the United States, residing at Los Angeles, in the county of Los Angeles and State of California, have invented a new, original, and ornamental Design for Bedsteads, of which the following is a specification, reference being had to the accompanying drawing, forming a part thereof.

The figure is a perspective view of a bedstead showing my new design.

I claim:

The new and ornamental design for a bedstead, as shown.

WILLIAM S. BIEL.

Copies of this patent may be obtained for five cents each, by addressing the "Commissioner of Patents, Washington, D. C."